(12) United States Patent
Amrhein

(10) Patent No.: US 6,268,675 B1
(45) Date of Patent: Jul. 31, 2001

(54) MAGNETICALLY JOURNALLED ELECTRICAL DRIVE

(75) Inventor: Wolfgang Amrhein, Ottensheim (AT)

(73) Assignee: Sulzer Electronics AG, Winterthur (CH)

(*) Notice: Subject to any disclaimer, the term of this patent is extended or adjusted under 35 U.S.C. 154(b) by 0 days.

(21) Appl. No.: 09/446,157
(22) PCT Filed: Jun. 19, 1998
(86) PCT No.: PCT/CH98/00267
  § 371 Date: Dec. 16, 1999
  § 102(e) Date: Dec. 16, 1999
(87) PCT Pub. No.: WO98/59406
  PCT Pub. Date: Dec. 30, 1998

(30) Foreign Application Priority Data

Jun. 21, 1997 (DE) .............................................. 197 26 351

(51) Int. Cl.[7] ...................................................... H02K 7/09
(52) U.S. Cl. ...................... 310/90.5; 310/180; 310/184; 310/185
(58) Field of Search ........................ 310/90.5, 179, 310/180, 182, 184, 185

(56) References Cited

U.S. PATENT DOCUMENTS

| 5,036,235 |   | 7/1991  | Kleckner . |
|-----------|---|---------|------------|
| 5,053,662 | * | 10/1991 | Richter ................................ 310/90.5 |
| 5,237,229 | * | 8/1993  | Ohishi ................................. 310/90.5 |
| 5,424,595 |   | 6/1995  | Preston . |

FOREIGN PATENT DOCUMENTS

0768750A1   4/1997   (EP) .

* cited by examiner

*Primary Examiner*—Nestor Ramirez
*Assistant Examiner*—Thanh Lam
(74) *Attorney, Agent, or Firm*—Townsend and Townsend and Crew LLP

(57) ABSTRACT

A magnetically journalled electrical drive comprises a magnetically journalled electrical machine with windings which are inserted in the stator or rotor for the production of the torque and the suspension force and an analog or digital electronic circuitry for control, regulation, monitoring and excitation of the magnetically journalled machine. The magnetically journalled machine is equipped in the stator or rotor with windings (24, 25, 26, 27) which are utilised via a corresponding excitation through the electronic circuitry both for the production of the suspension force and for the production of the torque.

14 Claims, 17 Drawing Sheets

MAGNETICALLY JOURNALLED ELECTRICAL DRIVE

The invention relates to a magnetically journalled electrical drive in accordance with the preamble of the independent patent claim.

BACKGROUND OF THE INVENTION

Magnetic journalling technology opens up fields of application of machine and apparatus construction with extremely high requirements on the speed of rotation region, the lifetime, the purity and the sealing tightness of the drive system—thus substantially fields of application which can not or can only with difficulty be realised using conventional journalling techniques. Various embodiments, such as for example high speed milling and grinding spindles, turbocompressors, vacuum pumps, or pumps for chemical or medical products of high purity are already being equipped with magnetic bearings.

A conventional magnetically journalled electrical machine (FIG. 1) requires, in addition to a machine unit 1, two radial magnetic bearings 2 and 3 respectively, an axial magnetic bearing 4, two mechanical interception bearings 5 and 6 respectively and a total of thirteen power controllers 7, 8, 9 and 10 for the excitation of the motoric and magnetic bearing loops.

There are proposals (FIG. 2) in the literature for integrating machine and radial magnetic bearings in a magnetic stator unit. Two separate winding systems 11 and 12 for the torque and suspension force winding are inserted into multiply layered into grooves in a stator. Both winding systems are three-looped and differ by one in the number of pole pairs. The coils are distributed over a plurality of grooves. The example of FIG. 2 shows:

- a four-pole machine winding 11 (outside): first loop 13, second loop 14, third loop 15
- a two-pole suspension winding 12 (inside): first loop 16, second loop 17, third loop 18.

The arrows (without reference symbols) from the rotor in the direction towards the stator or from the stator in the direction towards the rotor stand for the direction of the magnetisation of the four magnetic rotor segments (e.g. radial or diametral magnetisation).

In applications which require no rigid-axis rotor guidance, such as for example in ventilators, fans, pumps or mixers, the axial magnetic bearing and the second radial magnetic bearing can be omitted from the integrated machine-magnetic-bearing embodiment. A prerequisite for this is a disc-shaped embodiment of the rotor with a length dimension (FIG. 3) which is small with respect to the rotor diameter. Thus a passive stabilization of the rotor position in the axial direction and the tilt directions can be achieved via the magnetic traction 41 between the stator 39 and the rotor 40.

In many cases however the complicated and expensive system construction and therewith the higher manufacturing costs stand in the way of the technical use of magnetic journalling. The object of the invention consists therefore in the simplification of the mechanical construction of the machine and magnetic bearing unit taking into consideration the electronic excitation which is suitable for this.

SUMMARY OF THE INVENTION

A magnetically journalled electrical drive comprises a magnetically journalled electrical machine with windings which are inserted in the stator or rotor for the production of torque and the suspension for it. An analog or digital electronic circuitry is used for control, regulation, monitoring, and excitation of the magnetically journalled machine. The magnetically journalled machine is equipped in the stator with windings which are utilized via a corresponding excitation through the electronic circuitry, both for the production of the suspension force for the rotor and for the production of torque. The rotor is of a type generating its own magnetic flux.

Of particular advantage in the solution of the object in accordance with the invention is the considerably simplified stator or rotor construction respectively and the winding construction of the magnetically journalled machine with respect to previously known solutions as well as the saving of power controllers.

BRIEF DESCRIPTION OF THE DRAWINGS

Exemplary embodiments of the invention are explained in the following with reference to the drawings. Shown in schematic illustration are.

DESCRIPTION OF THE PREFERRED EMBODIMENT

Figure 1:
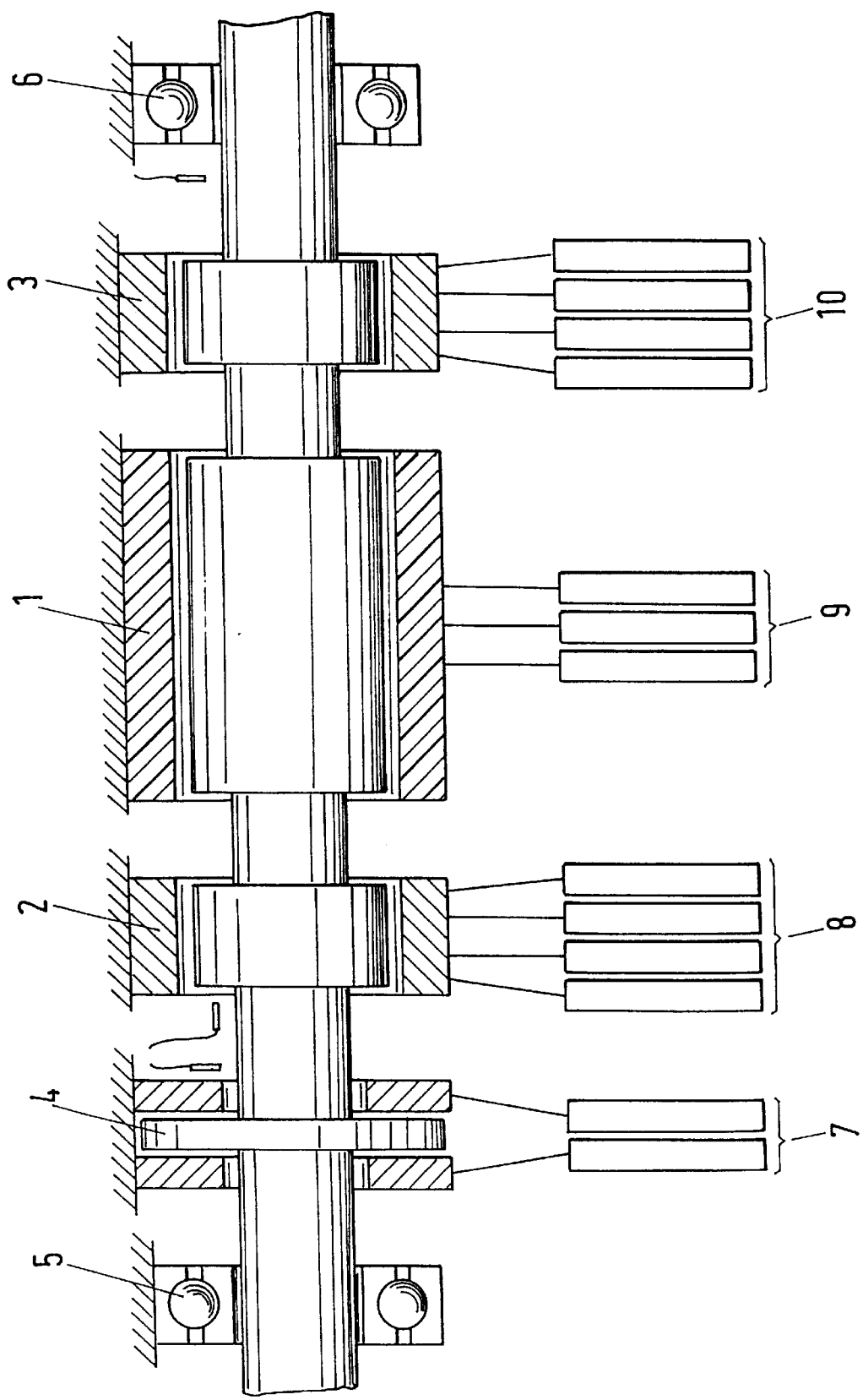
FIG. 1 is an exemplary embodiment of a conventional magnetically journalled electrical machine of the prior art.
Figure 2:
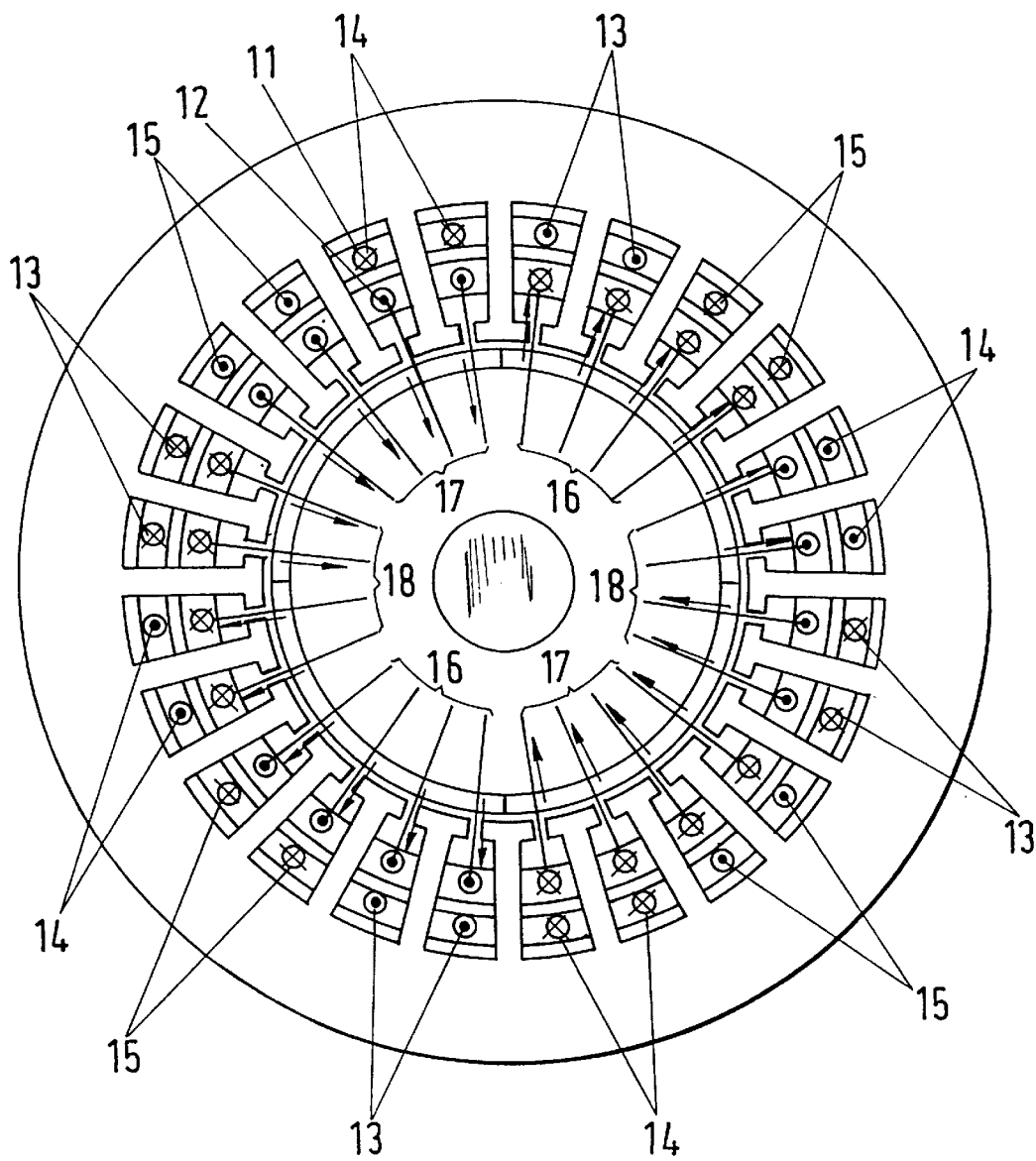
FIG. 2 is an exemplary embodiment of a conventional magnetically journalled electrical machine in which the machine and the radial magnetic bearing are integrated into a magnetic stator unit of the prior art.
Figure 3:
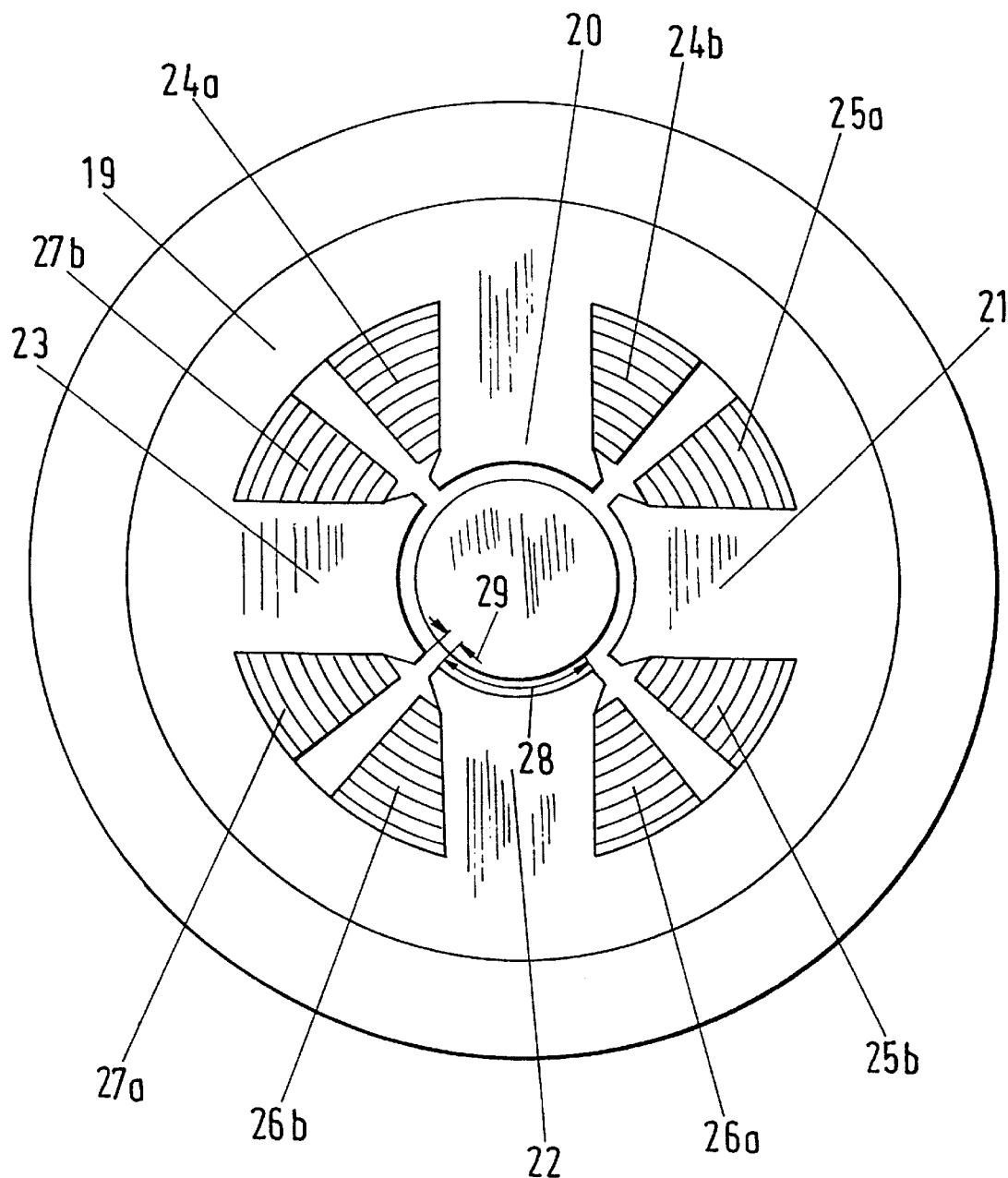
FIG. 3 is an exemplary embodiment of a magnetically journalled electrical drive in accordance with the invention.
Figure 8:
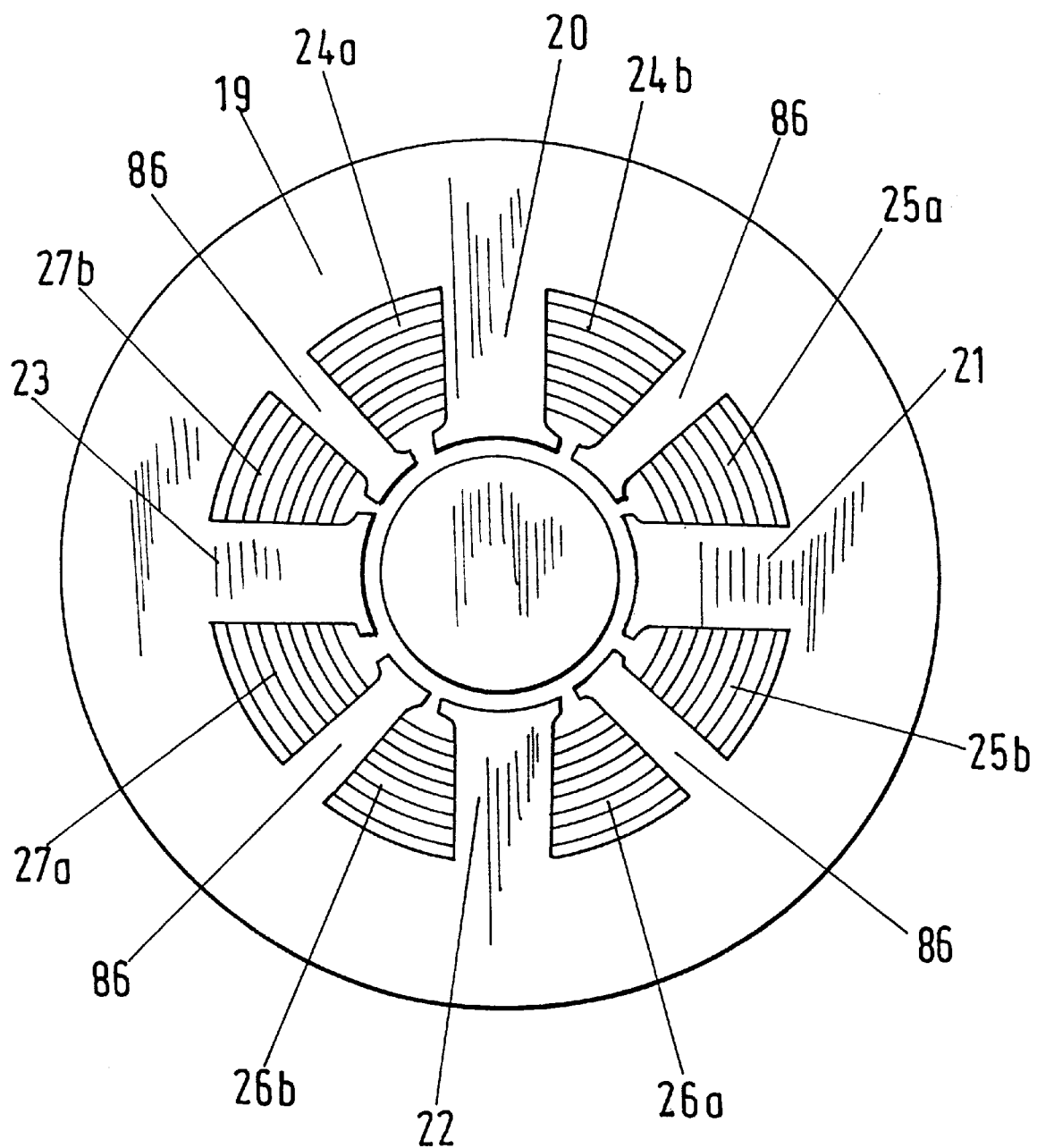
FIG. 8 is an exemplary embodiment of the drive with fractionally pitched concentrated windings and with pronounced poles and auxiliary poles.

FIG. 3 shows an embodiment of an integrated machine-magnetic-bearing unit. In this, two separate winding systems with different numbers of pole pairs are not introduced into the stator, as in conventional embodiment in accordance with FIG. 2, but rather the functions of the torque and suspension force production are integrated in one winding system. This winding system is composed of individual pole windings 24, 25, 26, 27 which are distributed at the periphery. Since these pole windings, as will still be described in the following, are excited by separate current supplies, magnetic fields with different numbers of pole pairs can be realised in the air gap such as are required for the torque and suspension force production. It should also be mentioned here that a machine of this kind can be operated both as a motor and as a generator depending on the application. An arrangement in accordance with FIG. 3 is selected as an exemplary embodiment, of which the stator is formed of a sheet metal cut 19 with four pronounced poles 20, 21, 22, 23 and four concentrated pole windings 24, 25, 26, 27 and of which the rotor is formed of a four-pole permanent magnet rotor. In contrast to the embodiment of FIG. 2, the winding coils of a loop are not distributed over a plurality of grooves. Fractionally pitching for the reduction of the harmonic content of the voltage and current is not provided in the sheet metal cut 19, but could take place through a shortening of the pole widths 28 (see FIG. 8), In the event of strong fractionally pitching it is favourable under certain conditions for the smooth running of the machine to largely close the large groove gap 29 which arises through shortening of the pole widths with a ferromagnetic auxiliary pole 86 (see FIG. 8), which can remain without a winding. For a better cooling the sheet metal cut 19 is for example fitted in an aluminium ring or aluminum cylinder respectively which surrounds it.

Figure 15:
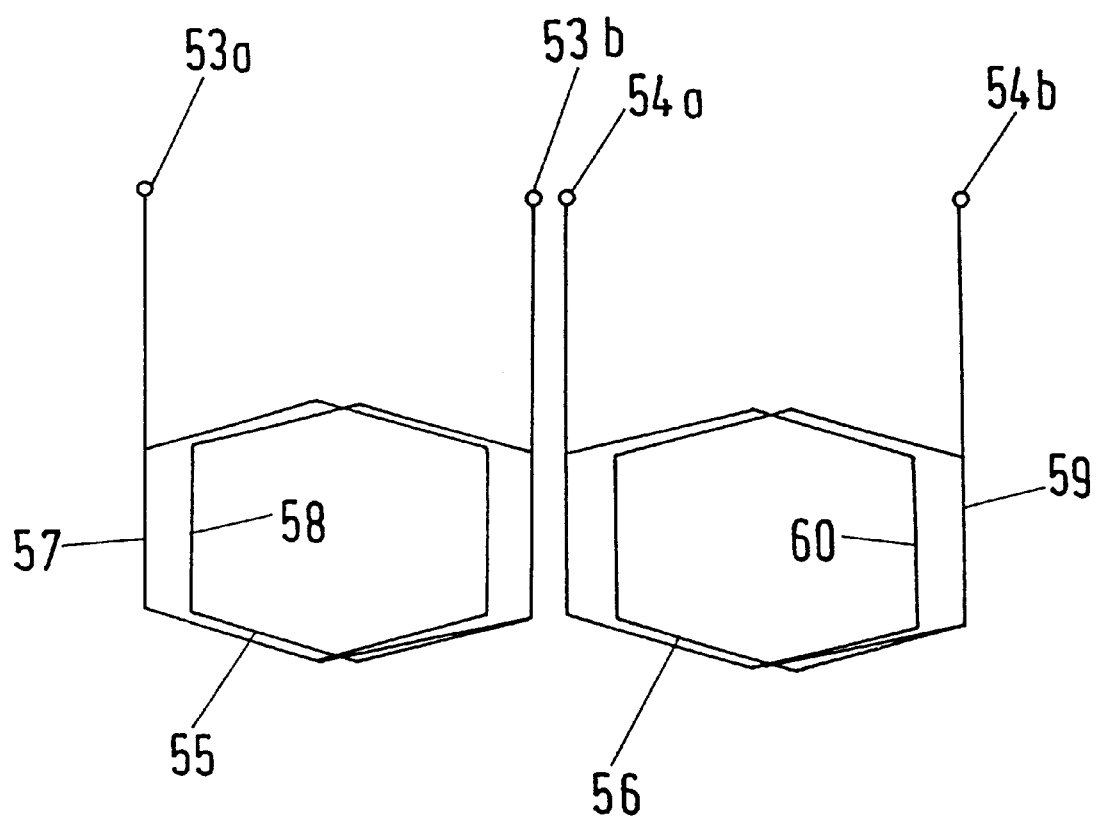
FIG. 15 illustrates coils connected together to form pole windings, FIG. 16 demonstrates a possibility of the controlled rolling down of the rotor at the stator poles; and, FIG. 17 is an exemplary embodiment of a drive in accordance with the invention with a special shaping of the rotor magnets for achieving a sinusoidal excitation field distribution in the air gap.

Referring to FIG. 15, a sinusoidal flux linking can also be achieved via a distribution of a plurality of coils (two are illustrated). In contrast to the previously known embodiments of magnetically journalled drives, the coils 57, 58 and 59, 60 are however, as illustrated e.g. in FIG. 15, connected together to pole windings 55 and 56 respectively with separate electronics connection 53a, 53b (together these form the connection 53) and 54a, 54b (together these form the connection 54) respectively. The distributed winding coils can be inserted into grooves or else realized as an iron-less air gap winding similarly to the bell anchor motors. FIG. 15 shows in an exemplary manner two of the total of four pole windings in accordance with FIG. 3 in a distributed embodiment rather than in a concentrated one.

In contrast to the embodiment in FIG. 2 there are no separate torque and suspension windings. Each of the four pole windings 24, 25, 26, 27 is responsible both for the torque production and the suspension force production. The realization of both functions can take place via a corresponding current excitation with three current components which are superimposed in the pole windings:

first current component (machine operation) for the production of a four-pole alternating field, second and third component (magnetic bearing operation) for the production of a two-pole rotary field.

Figure 4:
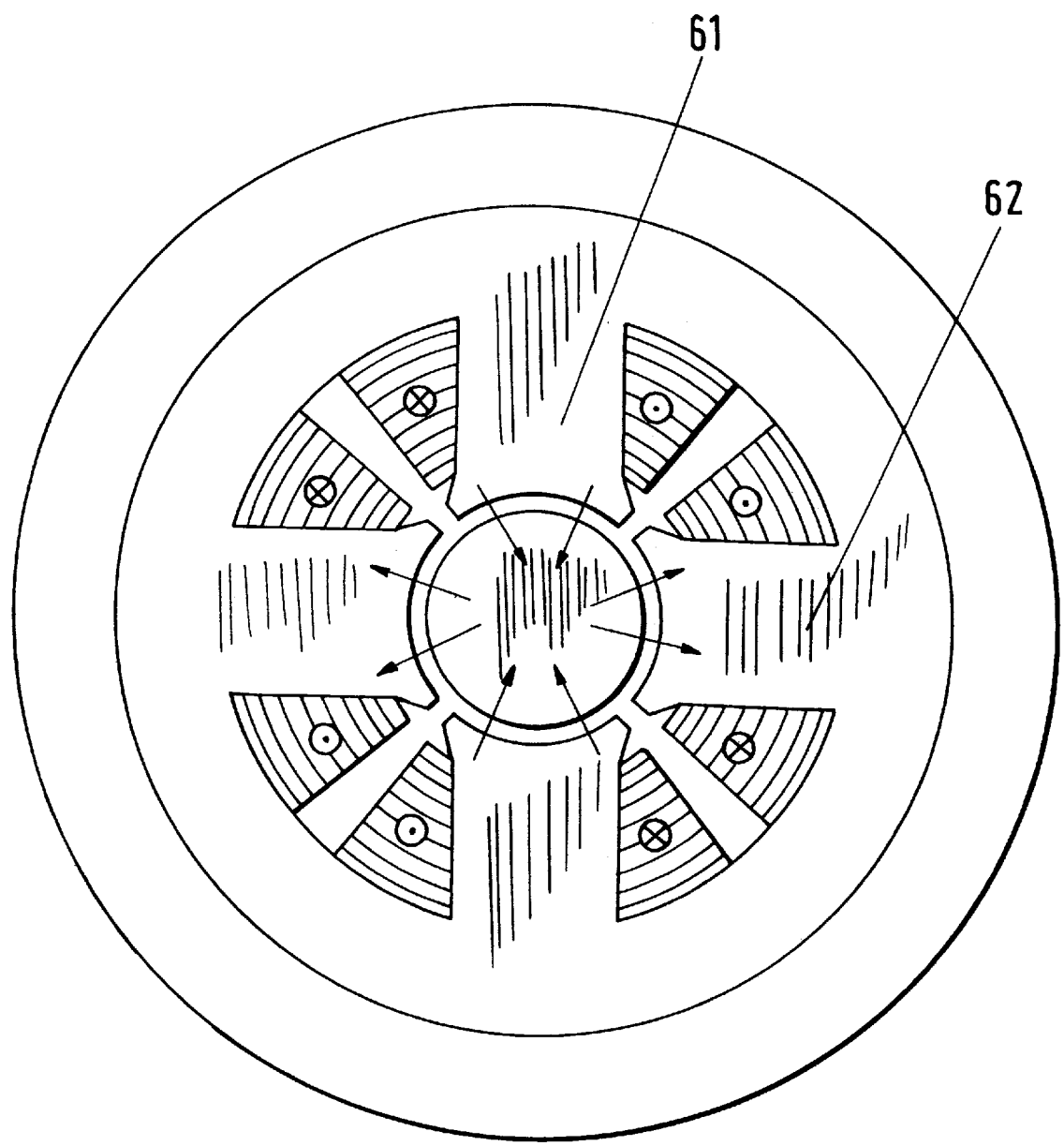
FIG. 4 is the exemplary embodiment of FIG. 3 with an individual illustration of the first current component, which serves for the production of a torque (four-pole field)
Figure 5:
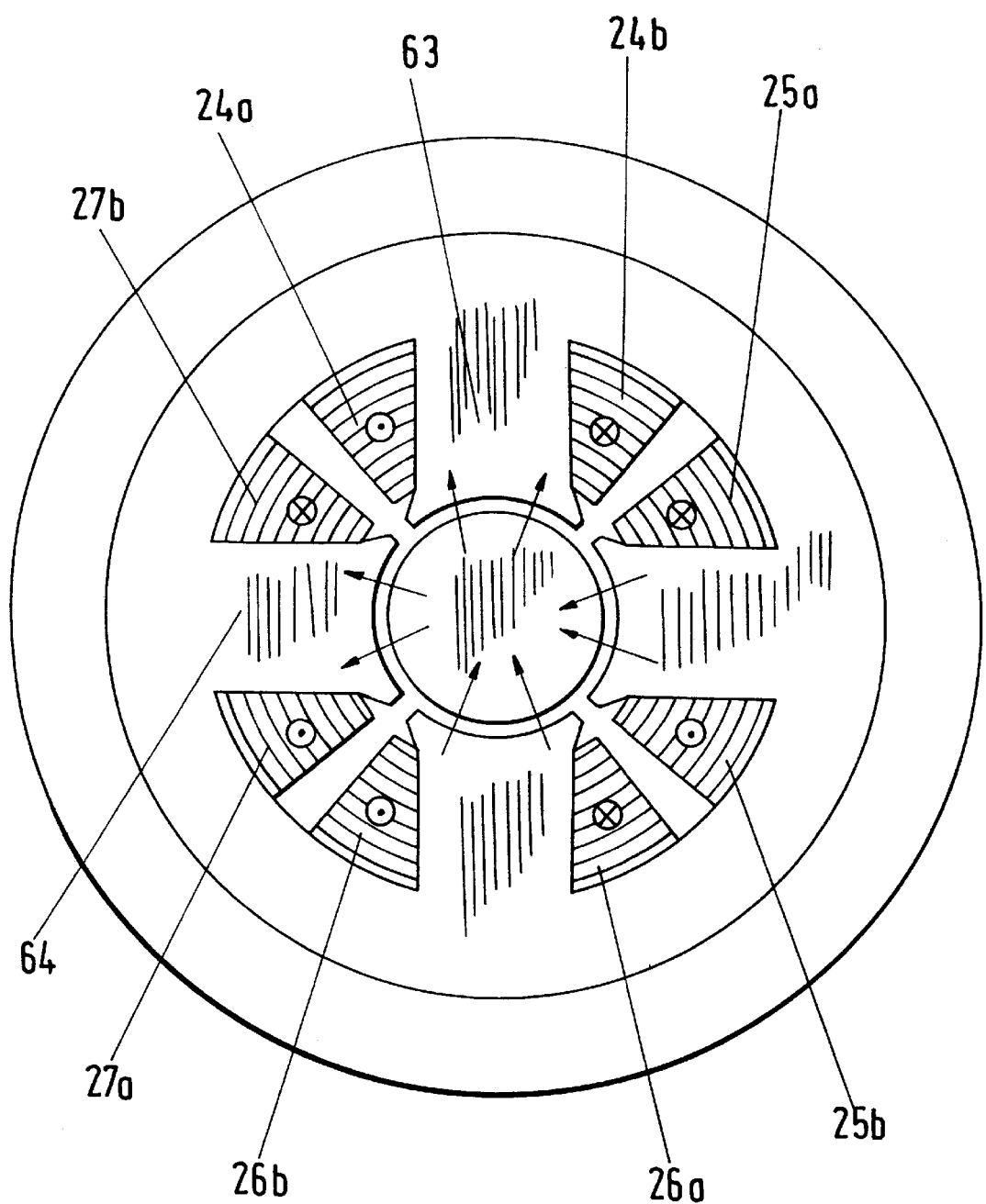
FIG. 5 is the exemplary embodiment of the drive in FIG. 3 with an individual illustration of the second current component, which forms one of the two current components for the production of a radially acting suspension force (two-pole field)
Figure 6:
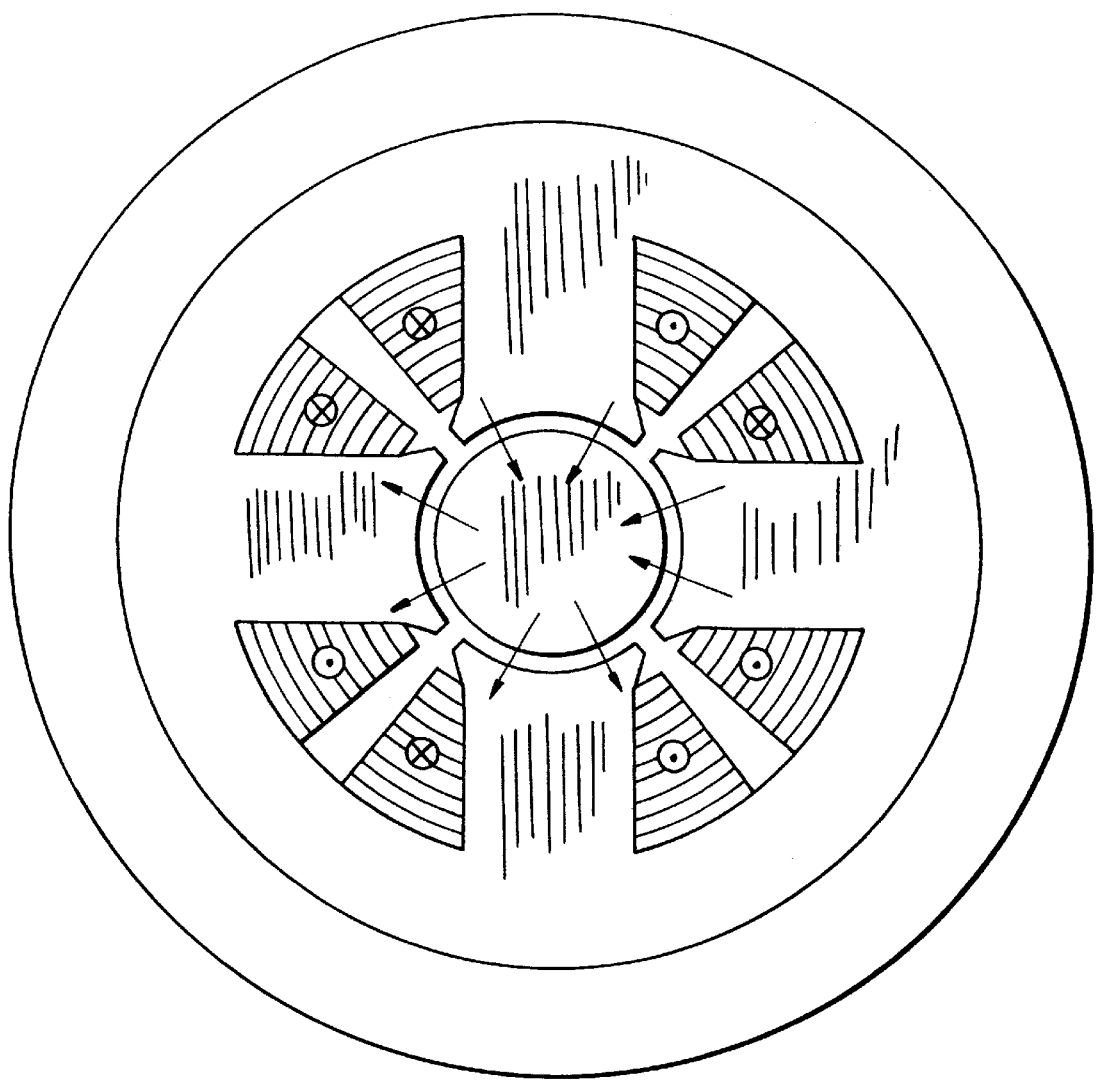
FIG. 6 is the exemplary embodiment of the drive in FIG. 3 with an individual illustration of the third current component, which forms the other of the two current components for the production of a radially acting suspension force (two-pole field)

FIG. 4, FIG. 5 and FIG. 6 show these components in individual illustration for an arbitrarily chosen operating state of the magnetically journalled machine. The current layers of the eight pole winding cross-sections are the same in amount within a figure. Likewise the current directions in the single pole windings are mutually determined within a figure. When the sign of the current component changes, the current direction thus changes in all pole winding cross-sections of a figure. The amplitude and the sign of each current component can be set freely and independently of the other current components. A variation of the first current component therefore leads, as is made clear in FIG. 4, to the setting of the amplitude and the direction of a four-pole alternating field. This stands in interaction with the four-pole rotor and produces a torque.

In FIG. 5 the direction of the second current component is illustrated. One recognises that the pole winding cross-sections 24a and 27b as well as 25b and 26a cancel one another within a groove. The remaining pole winding cross-sections 24b and 25a as well as 26b and 27a thus act as one loop of a two-pole winding.

FIG. 6 shows the direction of the third current component 3. The distribution of the current layer takes place in the same manner as in FIG. 5, however rotated by ninety degrees. With the second and third current component thus a two-pole rotary field can be built up and the radial suspension force can be set in magnitude and direction through the choice of the amplitude and phase of the two current components.

Figure 7:
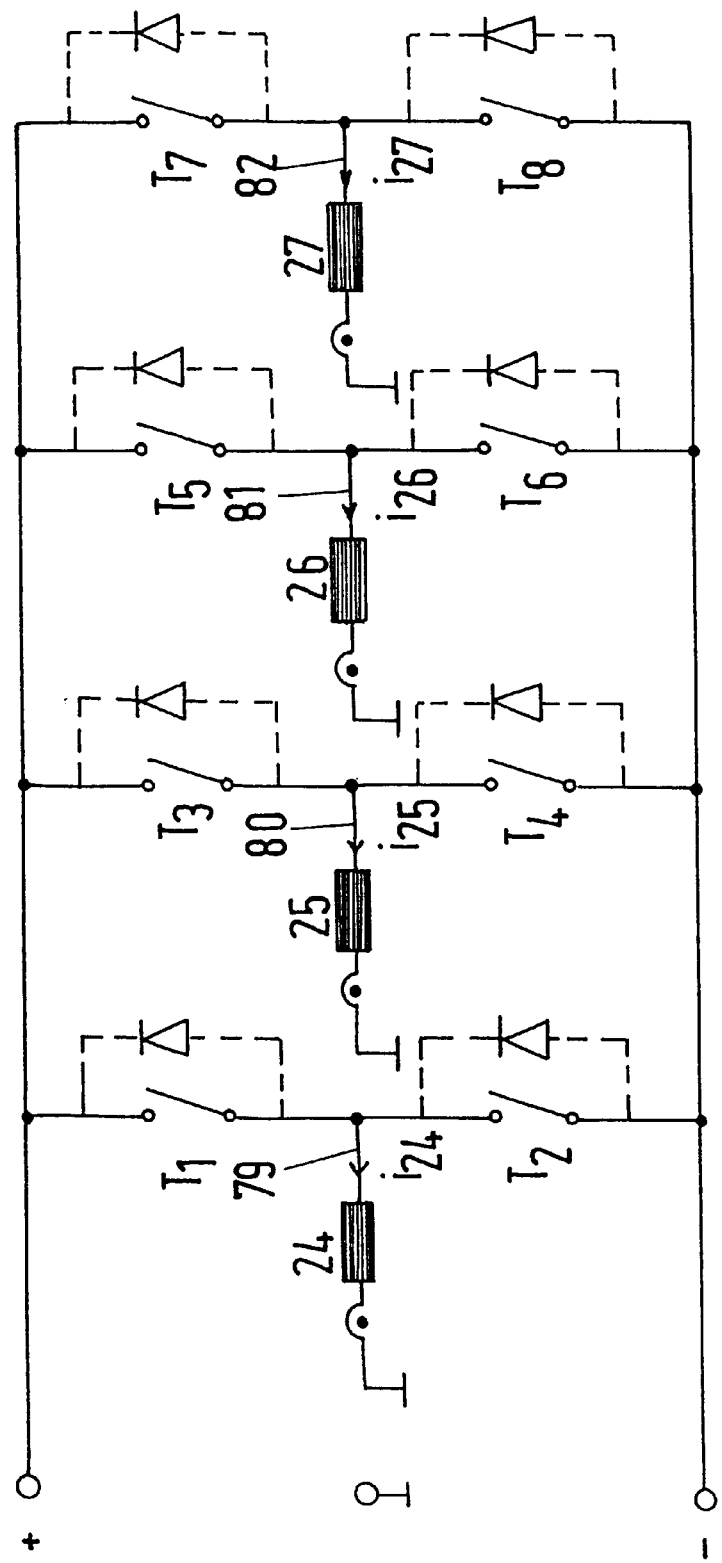
FIG. 7 is an exemplary embodiment of a bridge circuit for the excitation of the windings of the drive in accordance with FIG. 3.

The determination of the individual current components takes place while taking into account the specified desired values and the actual values for example of the rotor position and speed of rotation, the rotor angle of rotation or torque after the evaluation of the sensor signals for the rotor position and rotor angle of rotation by means of an analog circuit or of a high speed computer unit. The signals of the current components are superimposed referred to pole windings, are amplified by means of a power electronic circuitry and supplied to the four pole windings 24, 25, 26, 27 via clocked switches or analog power amplifiers. A possible bridge circuit is given in FIG. 7. Instead of the impression of a current an impression of the voltage can also take place taking into account the characteristic of the regulation path.

Figure 9:
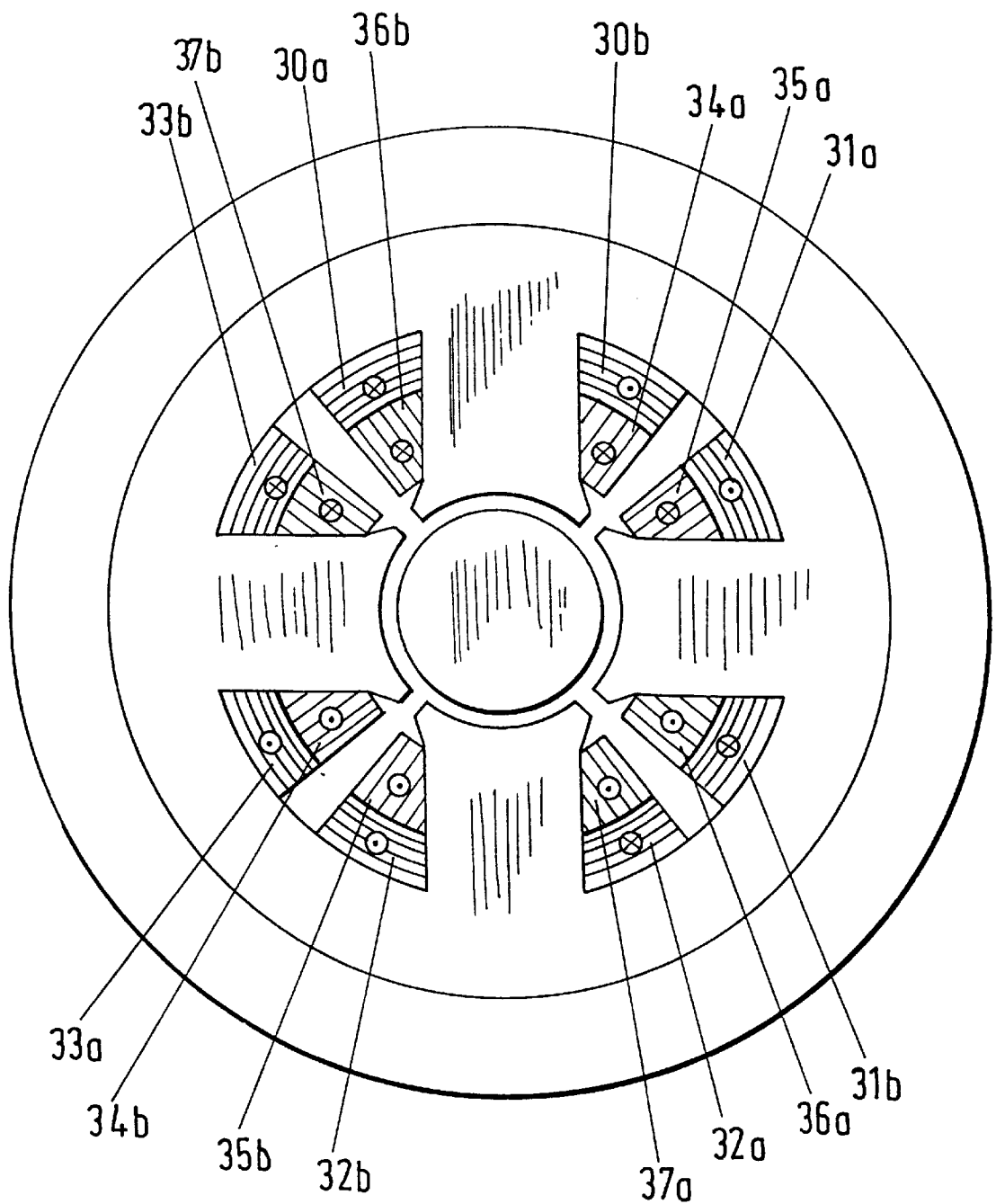
FIG. 9 is a technical winding variant of a drive which has three loops.

FIG. 9 shows a technical winding variant with three loops in which a separate loop (machine loop: 30a, 30b, 31a, 31b, 32a, 32b, 33a, 33b; first magnetic bearing loop: 34a, 34b, 35a, 35b; second magnetic bearing loop: 36a, 36b, 37a, 37b) is associated with each current component, with it being possible to connect the coils of a loop in series or in parallel. The superposition thus does not take place at the current level as in FIG. 3, but rather at the current layer or field level respectively. The position of the individual loop coils results from the observations on FIGS. 4 to 6. The currents of the loops I–IV (loop I: pole winding 24, loop II: pole winding 25, loop III: pole winding 26, loop IV:

pole winding 27) and of the loops I'–III' (loop I': windings 30–33, loop II':

windings 34–35, loop III': windings 36–37) can be conducted across into one another.

The following transformation relations hold for the chosen current direction symbols:

$$i_I = i_{I'} - i_{II'} + i_{III'};\ i_{II} = i_{I'} - i_{II'} - i_{III'};\ i_{III} = i_{I'} + i_{II'} - i_{III'};\ i_{IV} = i_{I'} + i_{II'} + i_{III'}$$

The winding arrangement of FIG. 9 is more complicated and expensive in manufacture than the winding arrangement in FIG. 3, but requires only the electric excitation of three loops rather than four, however. Which arrangement is more favourable from the economical point of view must be considered on a case by case basis. Of technical interest under certain circumstances in the arrangement in FIG. 3 is the possibility of being able to freely associate the weighting between the first as well as the second and the third current components. Thus for example in an idling machine the total available winding cross-section is nearly entirely used for the production of suspension force or, respectively, in a machine which is unstressed in regard to suspension, nearly the entire winding cross-section is used for the production of a torque. In a winding arrangement in accordance with FIG. 9 such a free association is not possible, since for example during the idling of the machine only the winding cross-section of the suspension force winding is available.

The rotor type of the machine can in principle be chosen freely, in particular when the machine operation takes place via a rotary field instead of an alternating field. Usable are for example permanent magnet rotors, short-circuit cage rotors, rotors with an electrically highly conducting metal jacketing instead of the short-circuit cage or reluctance rotors with angle-dependent air gap variations.

Figure 12:
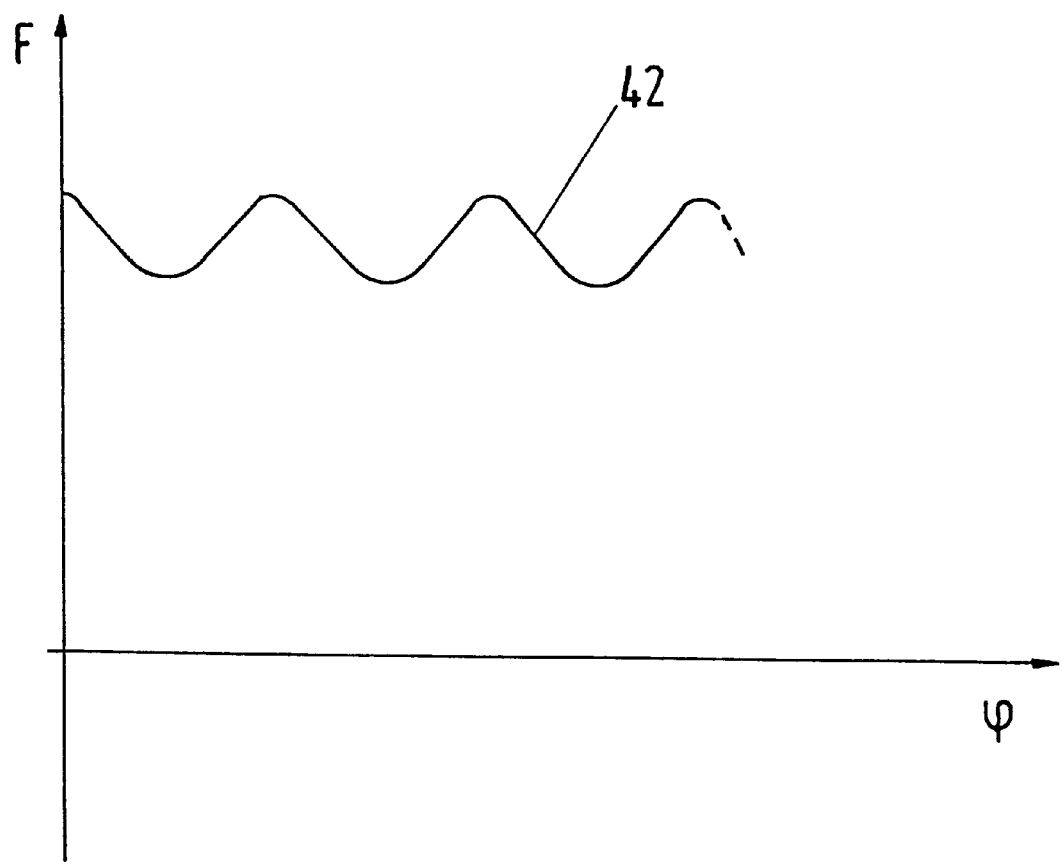
FIG. 12 is an illustration of the angle dependent force fluctuations in non-sinusoidal stator current layer distributions and non-sinusoidal excitation field distribution in the air gap.

In the event of insufficient fractionally pitching or distribution respectively of the windings and in the event of non-sinusoidal excitation field distributions, angle dependent radial force fluctuations 42, such as are illustrated for example in FIG. 12, arise through the harmonic content of the air gap fields in the current excitation of the winding in accordance with FIG. 5 or FIG. 6 or, respectively, of the loops II' or III' in accordance with FIG. 9 with a constant current amplitude when the rotor is rotated. This effect should be taken into account in the current excitation of the windings in order to achieve a good operating behaviour.

Figure 17:
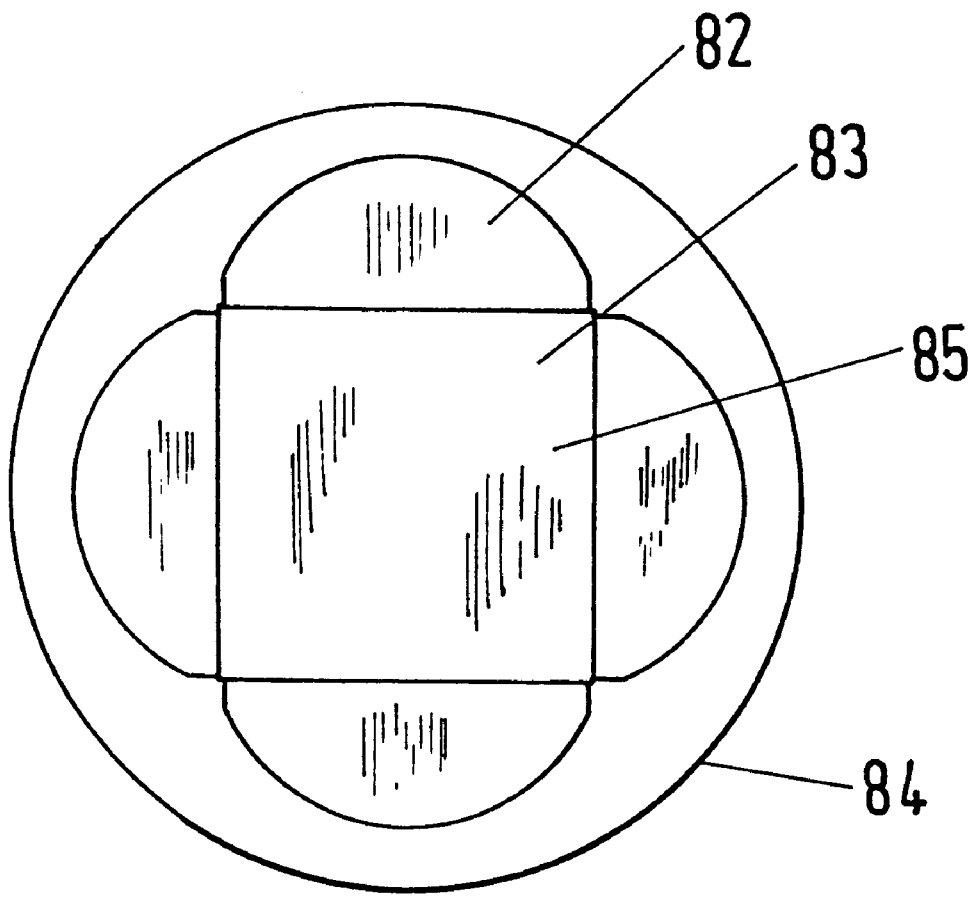

An approximately sinusoidal excitation field distribution can be achieved in the use of permanent magnet rotors 85 for example through a shaping of the permanent magnets 82 with an angularly dependent air gap between the rotor and the stator 84 in accordance with FIG. 17. A diametral magnetisation of the permanent magnets also acts favourably with respect to a sinusoidal field distribution. The ferromagnetic rear contact or yoke of the rotor is designated by 83. For reasons of cost it can however be advantageous to use concentrated windings and radially or diametrally magnetised magnets without a special shaping.

Figure 10:
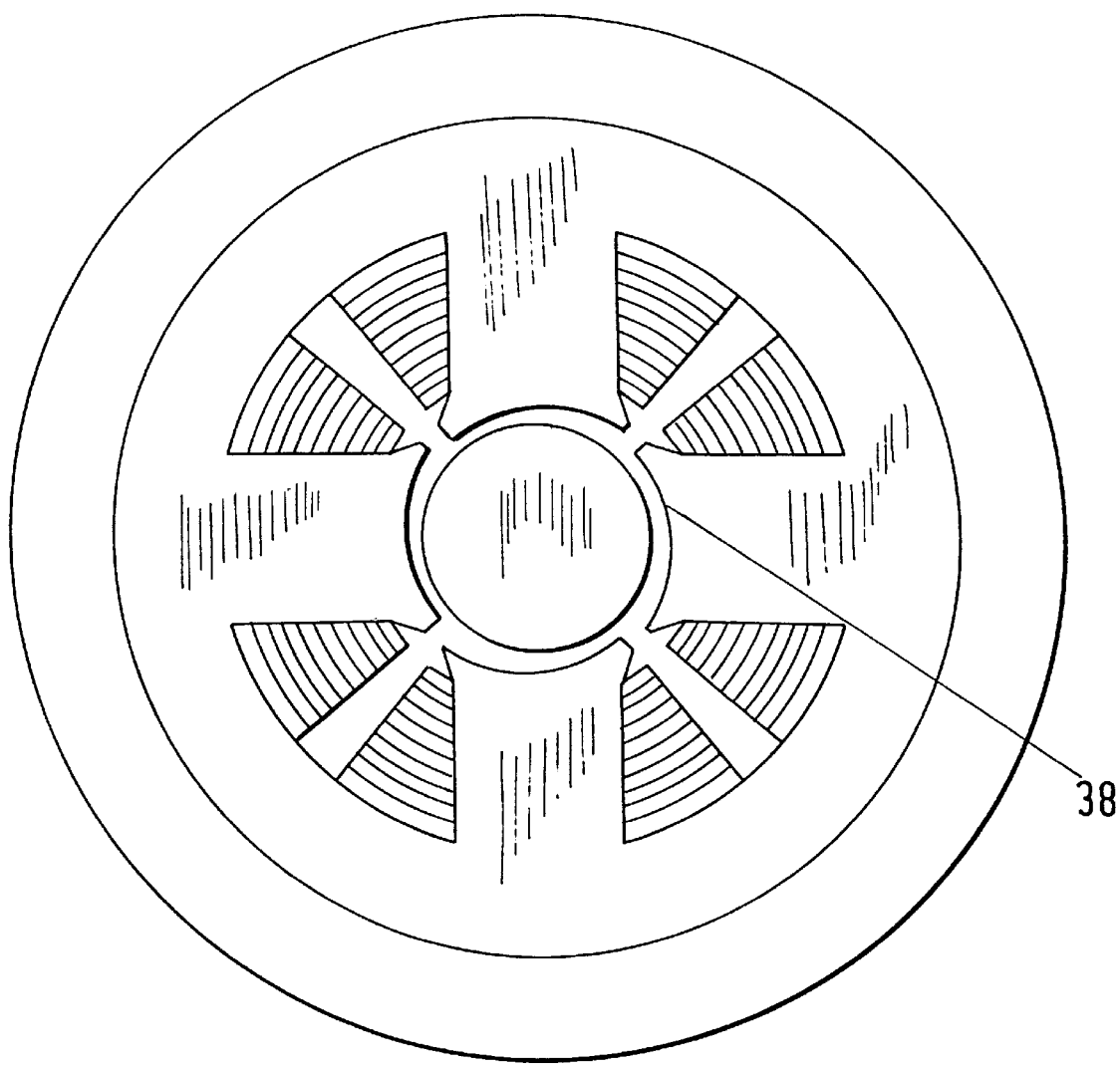
FIG. 10 is an exemplary embodiment of the drive in accordance with the invention with an asymmetric sheet metal cut in the region of the winding poles.
Figure 11:
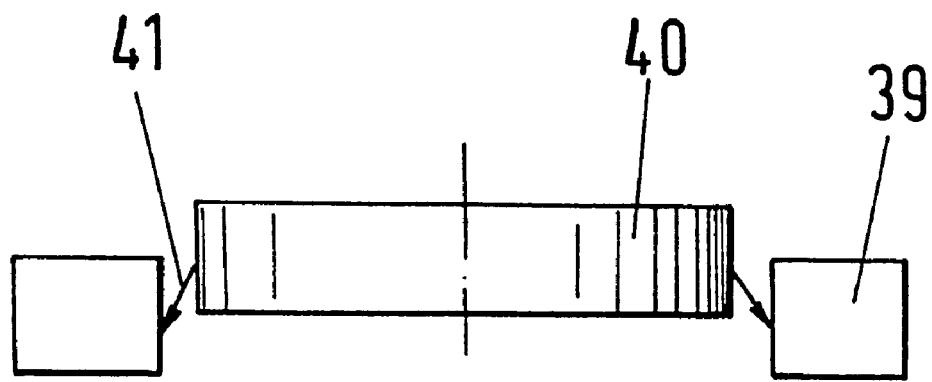
FIG. 11 is an exemplary embodiment of a drive with a disc-shaped rotor and passive stabilisation in the axial direction and in the tilt directions.
Figure 11:
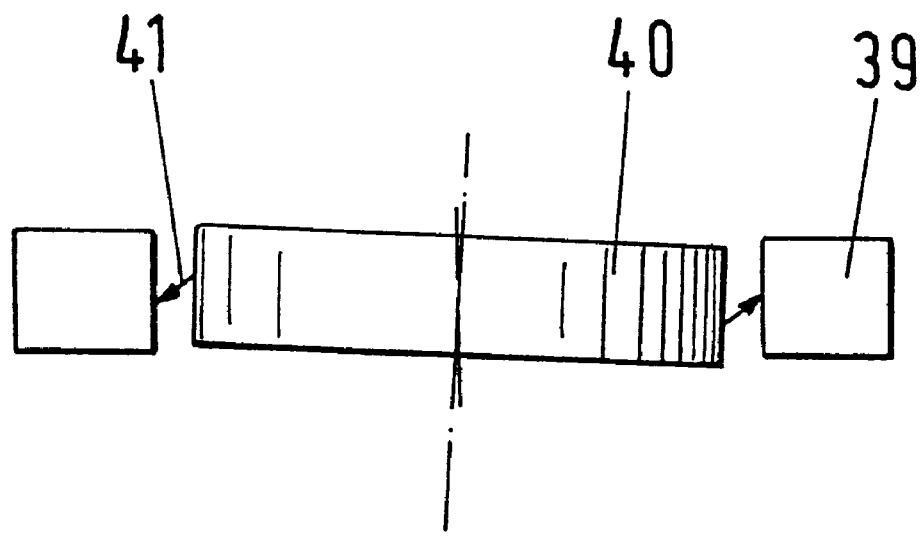
Figure 13:
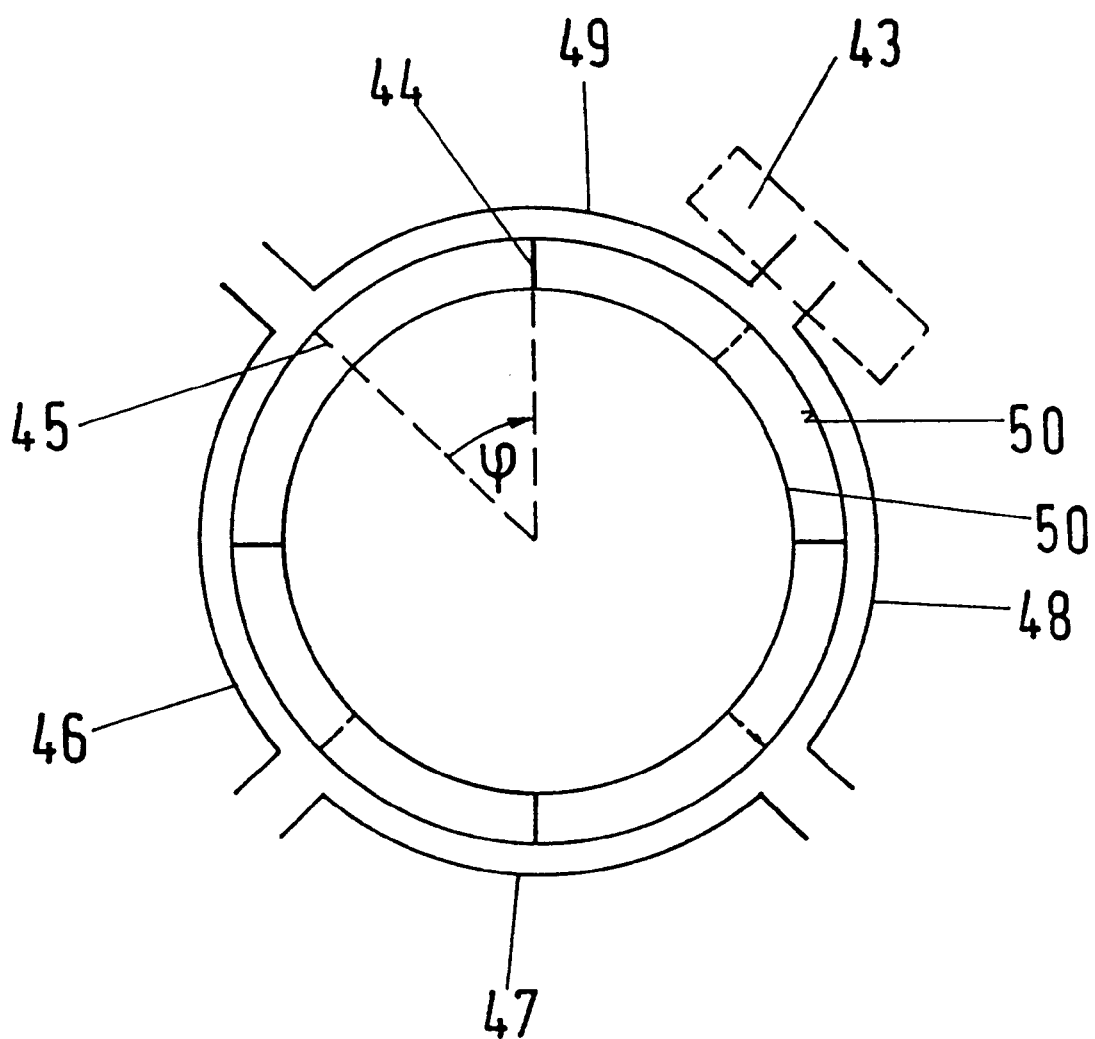
FIG. 13 is an exemplary embodiment of a drive in accordance with the invention with an auxiliary magnet for ensuring the start-up in a motor operation with an alternating field.

Since only an alternating field is available for the machine operation in the magnetically journalled machine in FIG. 3 or FIG. 9 respectively, an auxiliary torque is to be provided where appropriate at the time point of the start-up for overcoming the dead zone. This can for example be done through an asymmetrical sheet metal cut 38 in the region of the winding poles (FIG. 10). A further proposed solution (FIG. 13) provides one or more auxiliary magnets 43 which are arranged axially or radially with respect to the rotor, and which for example bring the four-pole permanent magnet rotor 50 into a favourable starting position 44 with the angle φ as a result of their drawing force. In the position 45 of the magnet pole boundary the starting torque would be zero with an arbitrarily high current. The winding poles are indicated by the positions 46, 47, 48 and 49. In order to assist the drawing force the auxiliary magnets can additionally be provided with an iron yoke.

Figure 16:
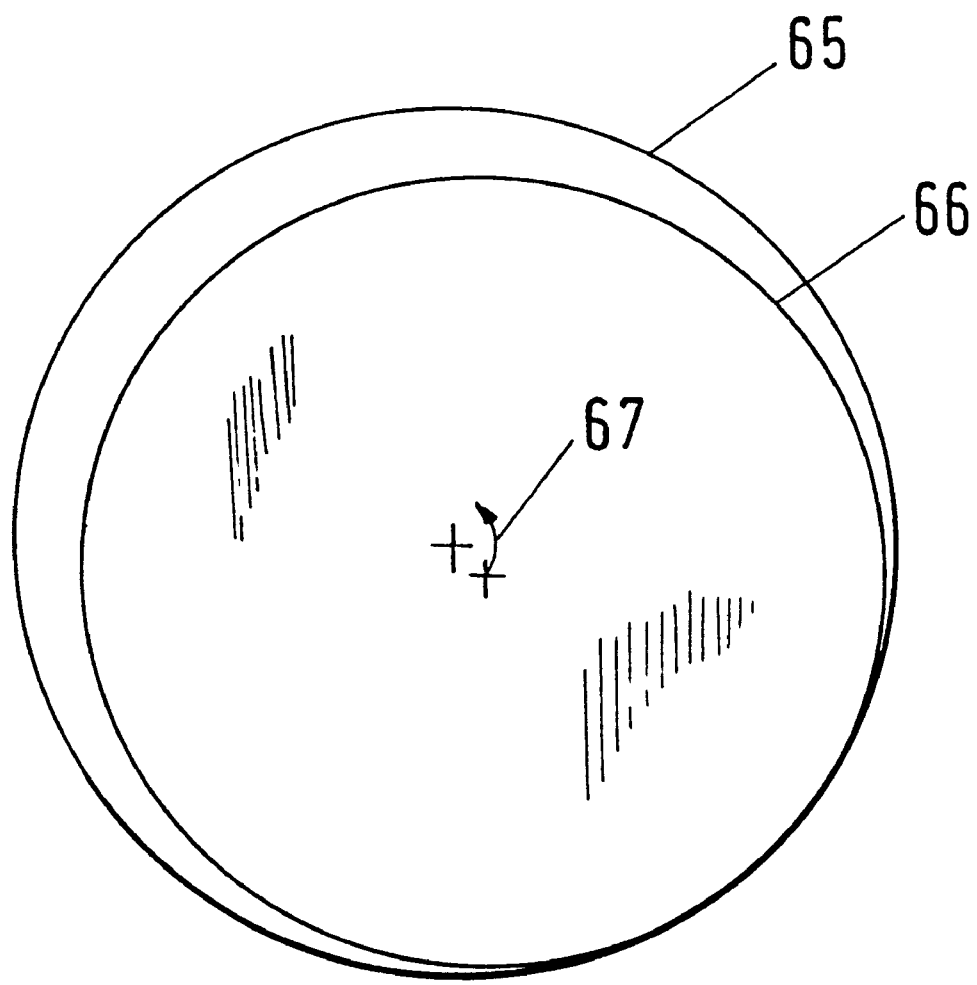

A change in the magnet pole position could also be produced through a rolling down of the rotor 66 at the end side of the air gap of the stator pole 65 which is controlled by the magnetic bearing part (FIG. 16). As a result of the different diameters there results in the rolling down a growing angular displacement between the magnet and stator poles so that the rotor can be rotated out of the dead zone in which a torque development is not possible. The midpoint movement of the rotor during the rolling down is represented by 67. It may be necessary to provide means at the periphery of the rotor and/or stator for preventing a sliding between the rotor and the stator during the rolling down movement (e.g. use of materials with high frictional values, roughening of the surfaces, toothing, etc.)

Figure 14:
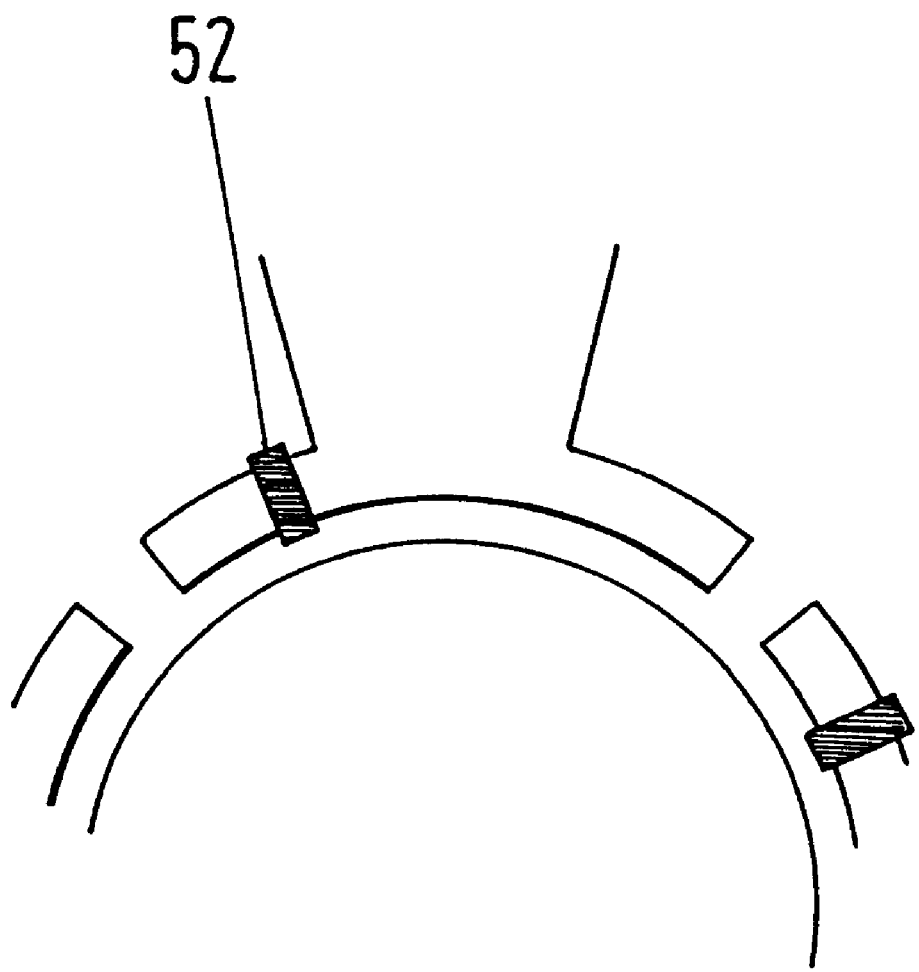
FIG. 14 is an exemplary embodiment of a drive in accordance with the invention short-circuit rings which are arranged one-sidedly on the stator poles.

A further proposed solution is illustrated in FIG. 14. The stator poles are provided on one side with a short-circuit ring 52 so that as a result of the short-circuit currents a highly elliptical rotary field develops in the air gap instead of the alternating field.

In FIGS. 3, 4, 5, 6, 9, 10, 13, 14, 16 and 17 magnetically journalled machines with an inner rotor were illustrated in each case. There is also the possibility of operating the magnetically journalled machine in an outer rotor embodiment. For this the rotor is to be executed as a ring or a bell; the stator poles point outwards.

FIGS. 3, 4, 5, 6, 9, 10, 13, 14, 16 and 17 are to be considered as exemplary both with respect to the number of pole pairs for the torque and suspension force production and with respect to the loop number. Modified numbers of pole pairs can also be realized, with it being necessary for the condition pM=pML±1 to be fulfilled between the number of pole pairs pM for the machine operation and the number of pole pairs pML for the magnetic bearing operation. Through enlargement of the loop number and the number of bridge branches in the electronic power circuitry a rotary field machine can also be integrated in accordance with the invention into the magnetically journalled drive instead of the alternating field machine.

What is claimed is:

1. A magnetically journalled electrical drive comprising:
   a magnetically journalled electrical machine having a rotor and a stator;
   the stator for the production of the torque and the suspension force of the rotor relative to the stator, the stator having at least four windings;
   the rotor suspended magnetically relative to the stator and producing magnetic flux; and,
   an electronic circuitry for control, regulation, monitoring and excitation of the stator having communication to the windings having three variable electrical components with at least one component responsive to driving the rotor relative to the stator and at least two components for suspending the rotor relative to the stator, the variable electrical components dynamically varying with respect to the windings of the stator to produced controlled suspension and controlled torque of the rotor relative to the stator.

2. The magnetically journalled electrical drive according to claim 1 wherein the electrical drive is a generator receiving torque at the rotor and producing current on the stator.

3. The magnetically journalled electrical drive according to claim 1 wherein the electrical drive is a motor generating torque at the rotor and responsive to current on the stator.

4. The magnetically journalled electrical drive according to claim 1 wherein the rotor rotates interior of the stator.

5. The magnetically journalled electrical drive according to claim 1 wherein the at least four windings define at least three loops in the stator, each loop having one of the three variable electrical components flowing through the windings.

6. The magnetically journalled electrical drive according to claim 1 wherein the rotor suspended magnetically relative to the stator and producing magnetic flux is chosen from the group consisting of a permanent magnet rotor, a short-circuit cage rotor, and a rotor with electrically highly conductive metal jacketing.

7. The magnetically journalled electrical drive according to claim 1 and wherein the windings are formed as pole windings with separate electronic connection; and, the electronic circuitry for control, regulation, monitoring and excitation of the stator having communication to the windings having a current available to the pole windings in each case for the production of a torque and for the production of a suspension force.

8. The magnetically journalled electrical drive according to claim 7 and wherein a pole winding is of a single coil.

9. The magnetically journalled electrical drive according to claim 7 and wherein a pole winding is of a plurality of coils, which are connected to one another.

10. The magnetically journalled electrical drive according to claim 7 and wherein at least two adjacent pole coils develop, in dependence on the current excitation of the pole windings, one effect chosen from the group consisting of:

a magnetic counter-pole, a common magnetic pole, and a magnetic field which, through the superimposition, can be decomposed both into a common magnetic pole and into magnetic counter-poles.

11. The magnetically journalled electrical drive according to claim 10 and wherein through the current excitation of the pole windings superimposed on magnetic fields with different numbers of pole pairs, the number of pole pairs differs by one from the magnetic fields.

12. The magnetically journalled electrical drive according to claim 10 and wherein:

the pole windings in the stator form in common both a rotary field of the number of pole pairs pML, of which the amplitude and phase can be set via the current excitation of the pole windings for the regulation of at least one of the suspension force and the rotor position, and, superimposed on this, a rotary field and/or an alternating field of the number of pole pairs pM=pML ±1, of which the amplitude and the phase in an alternating field and, amplitude can be set via the current excitation of the pole windings for the control of at least one of the group consisting of torque, the speed of rotation of the rotor, and the rotor position.

13. The magnetically journalled electrical drive according to claim 1 wherein with four pole windings a rotary field is produced for the production of suspension force and an alternating field is produced for the production of torque; and, a start-up aid for the reliable start-up of the magnetically journalled machine is used, chosen from at least one of the group consisting of:

an asymmetrical sheet metal cut (38), one or more auxiliary magnets, one or more short-circuit rings, or setting up a favorable start-up position using a corresponding excitation of the pole windings through the rolling down of the rotor on the stator surface facing the air gap.

14. The magnetically journalled electrical drive according to claim 1 wherein:

the magnetically effective part of the rotor and the stator is designed in a shape chosen from the group consisting of a disc, a ring, a bell shape; and the axial dimensions are small relative to the radial dimensions so that a stable passive magnetic journalling of the rotor in the axial direction and the two tilt directions occurs which is sufficient for operation forces arising as a result of the magnetic air gap fields.

* * * * *